(12) United States Patent
Shen et al.

(10) Patent No.: US 9,369,388 B2
(45) Date of Patent: Jun. 14, 2016

(54) FORWARDING INDEX BASED ADAPTIVE FABRIC LOAD BALANCING

(71) Applicant: Cisco Technology, Inc., San Jose, CA (US)

(72) Inventors: James Zhijiang Shen, San Ramon, CA (US); Pingching Vincent Ng, Union City, CA (US); Huaqing Zeng, Fremont, CA (US); Ju Lin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 97 days.

(21) Appl. No.: 14/163,853

(22) Filed: Jan. 24, 2014

(65) Prior Publication Data

US 2015/0215210 A1 Jul. 30, 2015

(51) Int. Cl.
*H04L 12/803* (2013.01)
*H04L 12/947* (2013.01)
*H04L 12/931* (2013.01)

(52) U.S. Cl.
CPC .............. *H04L 47/125* (2013.01); *H04L 49/25* (2013.01); *H04L 49/351* (2013.01)

(58) Field of Classification Search
None
See application file for complete search history.

(56) References Cited

U.S. PATENT DOCUMENTS

| 7,136,384 | B1 * | 11/2006 | Wang .......................... 370/395.1 |
| 8,077,726 | B1 * | 12/2011 | Kumar et al. ............ 370/395.31 |
| 8,625,624 | B1 | 1/2014 | Rose et al. |
| 8,774,179 | B1 * | 7/2014 | Gaggara et al. ............... 370/389 |
| 2009/0141622 | A1 * | 6/2009 | Bitar .............................. 370/225 |
| 2012/0195195 | A1 * | 8/2012 | Rai et al. ........................ 370/235 |
| 2013/0201826 | A1 | 8/2013 | Testa et al. |
| 2013/0258838 | A1 | 10/2013 | Colven et al. |
| 2015/0124586 | A1 * | 5/2015 | Pani .............................. 370/219 |

FOREIGN PATENT DOCUMENTS

WO 2010057198 A1 5/2010
WO 2013067943 A1 5/2013

* cited by examiner

*Primary Examiner* — Hassan Kizou
*Assistant Examiner* — Hashim Bhatti
(74) *Attorney, Agent, or Firm* — Patterson + Sheridan, LLP

(57) ABSTRACT

Embodiments generally provide techniques for load balancing data transmitted between line cards across a network fabric. Embodiments receive, at a first line card within a modular Ethernet switch, data to be transmitted to a second line card within the modular Ethernet switch. A mask table is accessed using a value corresponding to the second line card as an index in order to retrieve a mask value. Embodiments select one of a plurality of links for the first line card for use in transmitting the data, based on a load balancing algorithm and the retrieved mask value. The data is then transmitted to the second line card using the selected link.

20 Claims, 6 Drawing Sheets

FORWARDING INDEX BASED ADAPTIVE FABRIC LOAD BALANCING

TECHNICAL FIELD

Embodiments presented in this disclosure generally relate to communications, and more specifically to load balancing data between line cards of a modular Ethernet switch.

BACKGROUND

In a communications network, network switches receive data at one of a set of input interfaces and forward the data on to one or more of a set of output interfaces. As a general matter, it is preferable that such switching devices operate as quickly as possible in order to maintain a high data rate. Switches are typically data link layer devices that enable multiple physical network (e.g., local area network (LAN) or wide area network (WAN)) segments to be interconnected into a single larger network. Switches forward and flood data traffic based on, for example, MAC addresses. In the most general sense, these types of networks transport data in the form of frames. A frame is a logical grouping of information sent as a data link layer unit over a transmission medium. Frames typically include header and/or trailer information used, for example, for routing, synchronization, and error control. The header and/or trailer information surrounds user data contained in the unit. The terms cell, datagram, message, packet and segment are also used to describe logical information groupings at various layers of the OSI reference model and in various technology circles. As used herein, the term "frame" should be understood in its broadest sense, and can encompass other terms such as cell, datagram, message, packet and segment.

A recent trend is to deploy blade servers within data centers, in place of more traditional servers. Blade servers generally have a modular chassis and a set of central processing unit ("CPU") blades plugged into that chassis. In addition to CPU blades, there are typically two or more network interface blades. For instance, some of these network interface blades can be used for Fibre Channel (FC) connectivity, e.g., to a storage area network (SAN), while others could be used for Ethernet connectivity. The use of such blade servers provides numerous benefits, including greater rack density, simplified interconnect, and lower cost. For example, a typical blade server could include multiple blades, each of which can be interconnected with a number of different switches, all within a single chassis. To other devices in the network, each of blades can appear to be an individual device. Each of blades may provide, for example, the functionality of a server that is operating independently of the other blades within chassis. The Ethernet switches within the server could provide redundant connections with, e.g., a local area network and the Internet, while the FC switches could provide redundant connections with a SAN and various storage devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Embodiments provide a method for load balancing traffic between line cards over a fabric. One embodiment receives, at a first line card within a modular Ethernet switch, data to be transmitted to a second line card within the modular Ethernet switch. A mask table is accessed, using a value corresponding to the second line card as an index, to retrieve a mask value. Additionally, the embodiment includes selecting one of a plurality of links for the first line card for use in transmitting the data, based on a load balancing algorithm and the retrieved mask value. The data is then transmitted to the second line card using the selected link.

Another embodiment provides a line card that includes a plurality of links connected to a network fabric, a memory containing a mask table, and logic configured to perform an operation. The mask table includes a plurality of mask values indexed by identifiers corresponding to remote line cards, where each of the plurality of mask values comprises a plurality of bits, and where each bit in the plurality of bits corresponds to a respective one of the plurality of links. The operation includes receiving data to be transmitted to a second line card. Additionally, the operation includes accessing the mask table, using a value corresponding to the second line card as an index, to retrieve one of the plurality of mask values. The operation also includes selecting one of a plurality of links for use in transmitting the data to the second line card, based on a load balancing algorithm and the retrieved mask value. The operation further includes transmitting the data to the second line card using the selected link.

Example Embodiments

Figure 1:
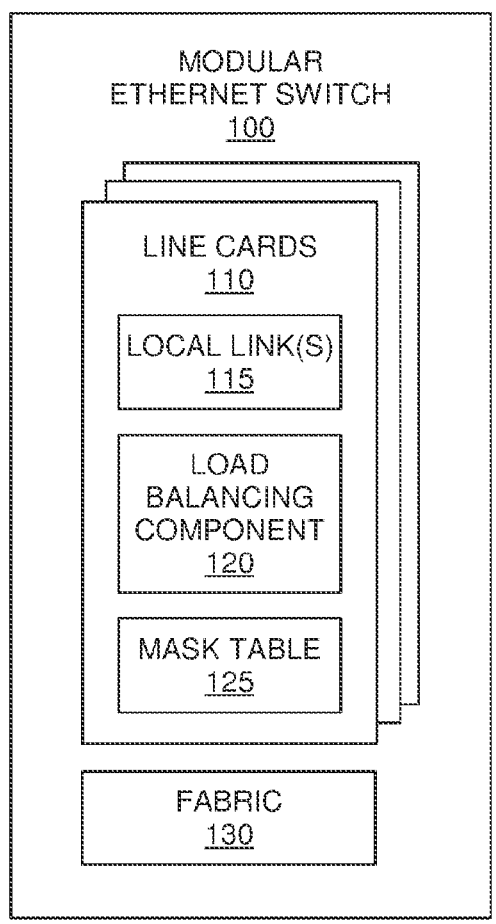
FIG. 1 illustrates a modular Ethernet switch configured with a load balancing component, according to one embodiment described herein.

Generally, modular server designs are becoming increasingly popular, as shown by the prevalence of blade servers in modern data centers. Such modular designs can be applied to network switches as well. An example of such a switch is shown in FIG. 1, which illustrates a modular Ethernet switch configured with a load balancing component, according to one embodiment described herein. As shown, the modular switch 100 includes a plurality of line cards 110 connected by way of a fabric 130. Such a switch 100 could be used, for instance, as part of a switching network to connect various network devices (not shown) to one another via connections between the network devices and the line cards (e.g., using the local link(s) 115 of the line cards 110).

Generally, such a switching network can employ a variety of different communication protocols enabling data communication between the network devices. The line cards 110 may take the form of an I/O interface card that typically performs data frame analysis as part of the switching process. As shown, each of the line cards includes one or more local link(s) 115, a load balancing component 120 and a mask table 125. For instance, the local link(s) 115 can represent serial/deserializer (SERDES) links that connect the respective line card 115 to the network fabric 130.

The switching fabric 130 connecting the line cards can also be implemented in a variety of ways. Three common types of switching fabrics 130 are single-bus architectures, shared-memory architectures, and crossbars. Single-bus switching fabric architectures generally use a central fabric element within the switch to which all the ports of the switch communicate, where each port arbitrates for access to this fabric since there is one central switching element.

With shared-memory architectures, a shared memory can be used to store data frames and a high-speed ASIC can be configured to read and write to the memory. In such an architecture, when frames enter the architecture, a switching core can place them in the memory and can then queue the frames to their outbound port. Buffering in such an architecture can be internal to the switching fabric and the buffers may be, e.g., fixed or dynamic buffers.

Crossbars use a mesh within the switching fabric to connect all the ports or all the line cards at high speed. Crossbars can be highly efficient for "balanced traffic," e.g., if port 1 and port 2 are communicating, and port 3 and port 4 are communicating, then the crossbar can direct those transmissions onto different paths within the fabric. One of the key benefits of crossbars is the ability to scale to significantly high bandwidth and throughputs, thus making crossbars a popular type of switching fabric. For instance, a crossbar switching fabric can includes one or more input buffers and one or more output buffers. In some implementations, there may be input and output buffers for each port in the switching fabric. Consequently, input and output buffers can be associated with particular line cards by virtue of the buffers' association with a particular port. Data frames to be transferred from one line card to another can first be queued in the queue corresponding to the first line card. Such a queue can be implemented as a first in first out (FIFO) buffer using a variety of memory structures. Once a data frame is ready for transmission, the data frame can be serialized and transmitted across a serial channel where it is received by an input buffer of the switching fabric. The data frame can then be transmitted across crossbar to the output buffer corresponding to the appropriate port of exit from the switching fabric. From the output buffer, the data frame can then be serialized and transmitted to the line card corresponding to output buffer port. The data is typically received at the line card in another queue data structure.

Generally, the load balancing component 120 is configured to load balance traffic being transmitted from one line card 110 to another line card, across the local link(s) 115 to the fabric 130. For instance, the load balancing component 120 could receive, at a first line card 110 within the modular Ethernet switch 100, data to be transmitted to a second line card within the modular Ethernet switch 110. The load balancing component 120 could access the mask table 125 to retrieve a mask value corresponding to the second line card. For example, the load balancing component 120 could access the mask table 125 using a value corresponding to the second line card as an index.

The load balancing component 120 could then select one of a plurality of links for the first line card for use in transmitting the data, based on a load balancing algorithm and the retrieved mask value. Generally, the load balancing component 120 can be configured to implement any load balancing algorithm, known or unknown, suitable for distributing data across the local links 115. Examples of such load balancing algorithms include, without limitation, round-robin load balancing and random choice load balancing algorithms. Additionally, the load balancing component 120 can be configured to take additional factors into consideration when selecting one of the local links 115 for use in transmitting the data, such as a local link's 115 current load, recent response times, bandwidth capabilities and so on.

Generally, the retrieved mask value corresponding to the second line card can be composed of a plurality of bits, where each of the plurality of 115 links for the line card 115 corresponds to a respective one of the plurality of bits. Moreover, load balancing component 120 can create the mask value such that the bits within the mask value are set to 1 when the corresponding link is suitable for use in transmitting data to the second line card. For example, the load balancing component 120 could determine a first value composed of a first plurality of bits for a first one of the line cards 110, where each of the plurality of local links 115 for the first line card 110 corresponds to a respective one of the first plurality of bits. Additionally, for each of the first plurality of bits, the load balancing component 120 could set the respective bit to 1 if the corresponding link is available to transmit data to the second line card, and otherwise the load balancing component 120 could set the respective bit to 0.

The load balancing component 120 could also determine a second value composed of a second plurality of bits, where each of the second plurality of local links 115 for the second line card corresponds to a respective one of the second plurality of bits. For each of the second plurality of bits, the load balancing component 120 could set the respective bit to 1 if the corresponding link of the second line card is available to receive data from the first line card, and otherwise the load balancing component 120 could set the respective bit to 0.

The load balancing component 120 could then create the mask value for use in transmitting data from the first line card to the second line card, by calculating the intersection of the determined first value and the determined second value. The load balancing component 120 could then store the mask value in the mask table 125, using a value corresponding to the second line card as an index. Once the load balancing component 120 has selected one of the local links 115, the load balancing component 120 can transmit the data to the second line card using the selected link. Doing so allows the load balancing component 120 to take full advantage of the potential bandwidth for transmitting data to the second line card across the fabric 130.

Figure 2:
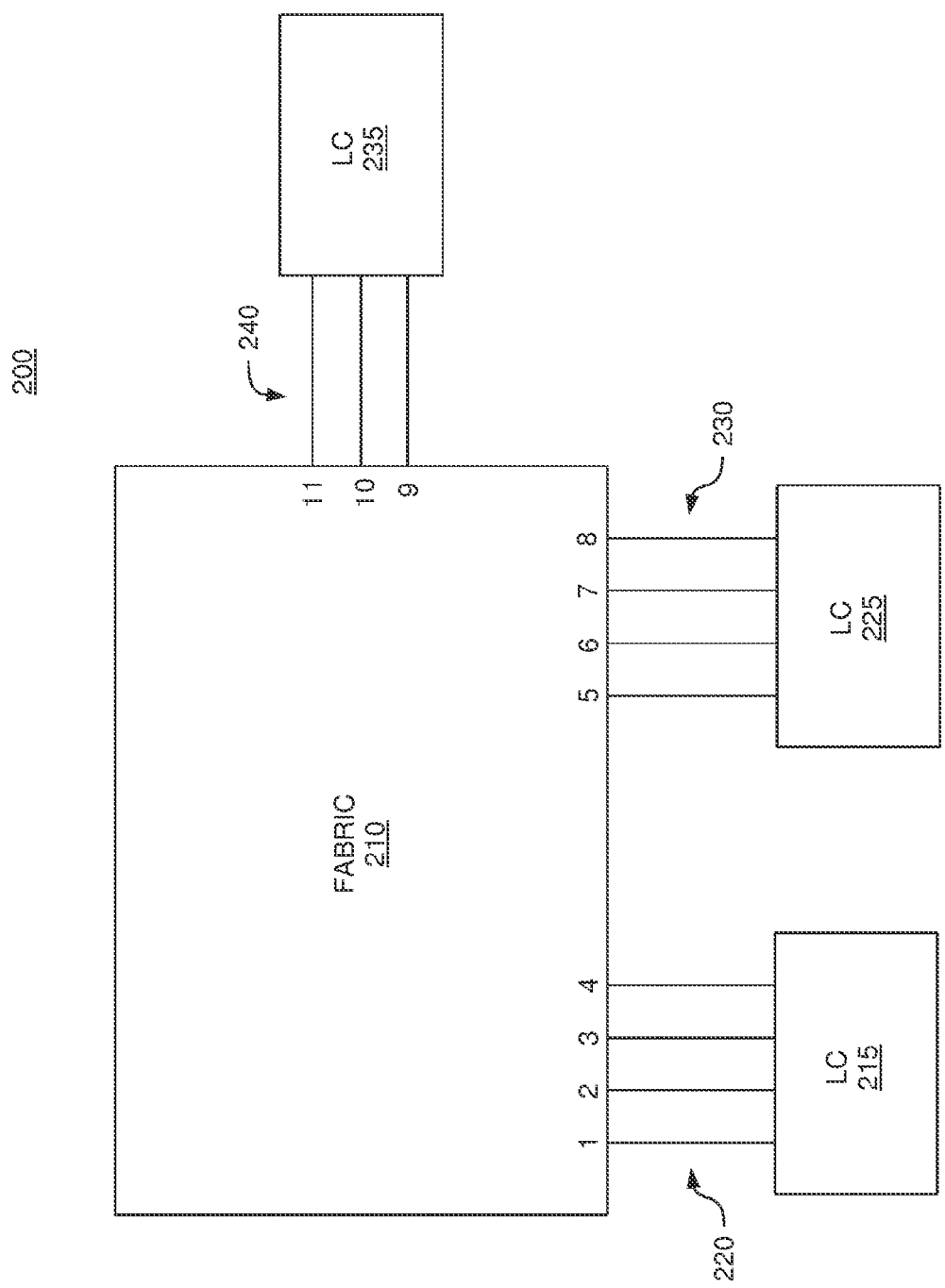
FIG. 2 illustrates line cards within a modular Ethernet switch interconnected by a fabric, according to one embodiment described herein.

FIG. 2 illustrates line cards within a modular Ethernet switch interconnected by a fabric, according to one embodiment described herein. Here, the system 200 includes line cards 215, 225, 235 that are connected to the switch fabric 210 using links 220, 230, 240, respectively. Although not shown, each of the line cards 215, 225, 235 can be configured with a load balancing component 120 and a mask table 125. The mask table 125 at each of the line cards 215, 225, 235 can contain mask values corresponding to each of the other line cards 215, 225, 235 shown in the system 200. For example, the mask table 125 at the line card 215 can contain a first mask value for the line card 225 and a second mask value for the line card 235. An example of such a mask table 125 is shown below in Table 1.

TABLE 1

Exemplary Mask Table

| Forwarding Index | Mask Value |
|---|---|
| X | 00001111 |
| Y | 00000111 |

For purposes of this example, assume that Table 1 shows the mask table 125 for line card 215, and further assume that the forwarding index X in Table 1 corresponds to the line card 225 and the forwarding index Y corresponds to the line card 235. As discussed above, the load balancing component 120 can compute the mask values by determining an intersection of a value representing the available links of the line card 215 and the available links of each of the line cards 225, 235. Thus, in this example, the mask value for forwarding index X (i.e., for data transmitted from line card 215 to line card 225) includes four bits set to a value of 1, as each of the line cards 215, 225 has four links 220, 230 connecting to the switch fabric (i.e., links 1-4 and links 5-8, as shown in FIG. 2).

As such, when the load balancing component 120 receives data to be transmitted to the line card 225, the load balancing component 120 could access the mask table 125 using the forwarding index for the data to be transmitted as an index (i.e., a forwarding index of X in this example) and could retrieve the mask value of "00001111." The load balancing component 120 could then determine that the data should be hashed across all four links 220 (i.e., links 1-4) to the fabric 210, and could transmit the data across the fabric 210 accordingly.

Likewise, if the load balancing component 120 then receives data to be transmitted to the line card 235, the load balancing component 120 could access the mask table 125 using the forwarding index for the data as an index into the mask table (i.e., a forwarding index of Y in this example). By doing so, the load balancing component 120 would retrieve the mask value of "00000111" from the mask table 125 shown in Table 1, based on the forwarding index of Y. As discussed above, the mask value can be determined based on an intersection of a value representing the available links of the line cards 215 and 235. Accordingly, as the line card 235 has three links 240 connected to the switch fabric 210, the retrieved mask value of "00000111" has three bits set to a value of 1. Thus, when transmitting data to the line card 235, the load balancing component 120 could determine based on the retrieved mask value of "00000111" that data should be hashed across only three of the four links 220 (e.g., links 1-3 of links 220). Doing so enables the load balancing component 120 to utilize all four links 220 when transmitting data to line card 225 and to dynamically adapt to using only three of the four links 220 when transmitting data to the line card 235. In other words, the load balancing component 120 is capable of selectively utilizing the fourth link in links 220 for better load balancing and for increased bandwidth across the switch fabric 210.

Generally, when determining the mask values for use with data transmission between line cards, the load balancing component 120 can consider how many links are available for the particular line cards. In some embodiments, the load balancing component 120 is configured to selectively disable certain links in certain situations. For instance, as a power saving measure, the load balancing component 120 could dynamically put a number of the links for a particular line card into a low power mode. For example, upon detecting that system traffic load for the line card is relatively low at a particular point in time, the load balancing component 120 could select one or more of the links and could set these links into a low power mode. Moreover, in doing so, the load balancing component 120 could update the mask values in the mask table 125 corresponding to the links in low power mode, such that load balancing component 120 will not select the links in the low power mode for data transmission. Upon detecting that increased bandwidth is needed, the load balancing component 120 can restore the low power mode links to full power mode, and can update the values in the mask table 125 accordingly, such that the load balancing component 120 can once again select the links as part of the load balancing algorithm. By dynamically bringing links into and out of a low power mode as needed, the load balancing component 120 can reduce power consumption relative to conventional systems in which all of the links are powered on all of the time, regardless of the amount of bandwidth required to support the current real-time traffic flow.

Figure 3:
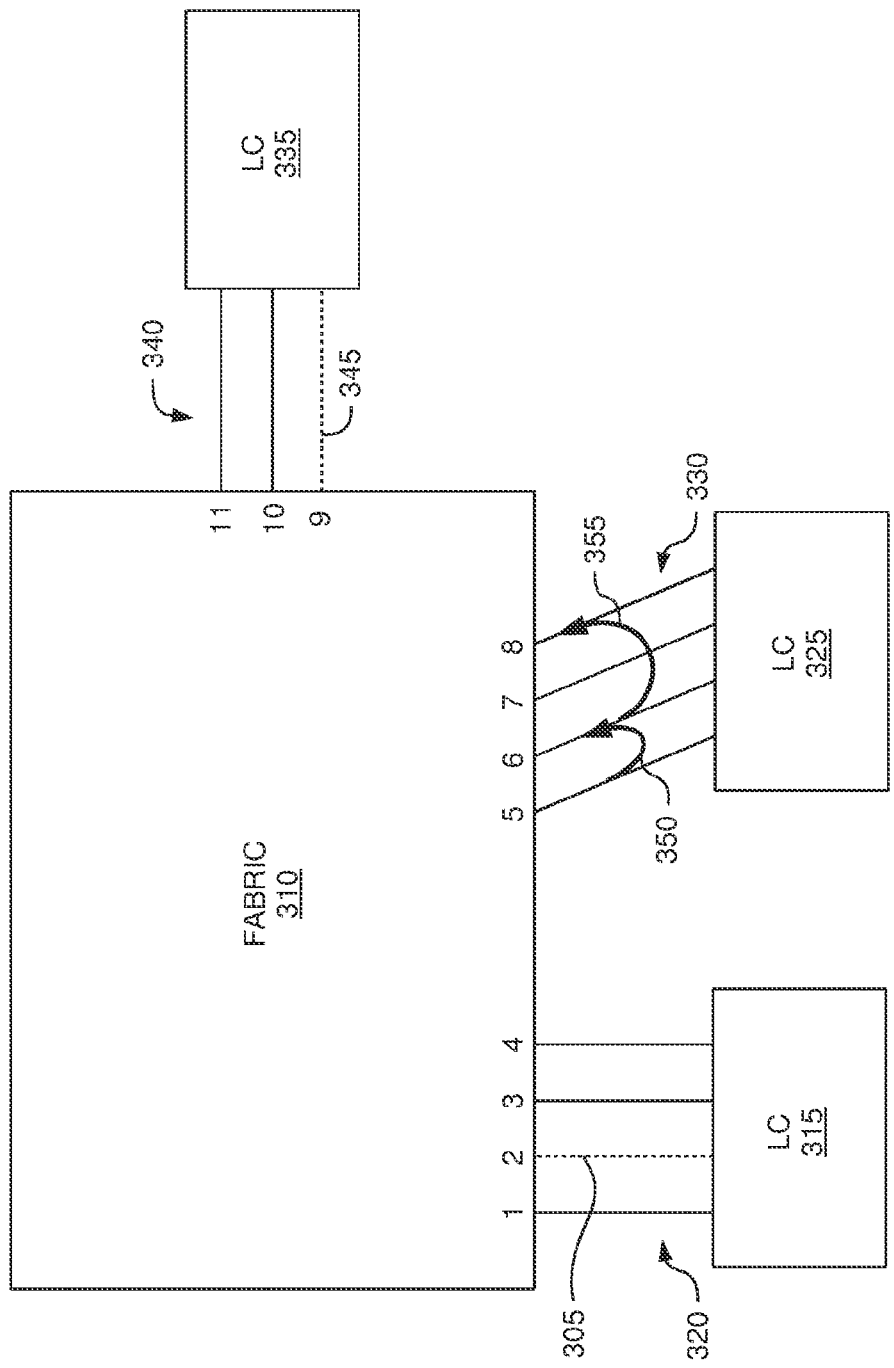
FIG. 3 illustrates a use case of load balancing traffic between line cards within a modular Ethernet switch interconnected by a fabric, according to one embodiment described herein.

An example of such an embodiment will now be discussed with respect to FIG. 3, which illustrates a use case of load balancing traffic between line cards within a modular Ethernet switch interconnected by a fabric, according to one embodiment described herein. As shown, the system 300 includes line cards 315, 325, 335 that are connected to the switching fabric 310 by links 320, 330, 340. For purposes of this example, assume that the load balancing component 120 has determined that the current system load is sufficiently low such that not all of the links 320, 340 are needed to support the traffic flowing to and from the line cards 315, 335. Accordingly, the load balancing component 120 in this example has set the link 345 into a low power mode, as indicated by the hashed line in FIG. 3. Additionally, the load balancing component 120 can be configured to dynamically disable a particular link, upon detecting an error condition has occurred for the particular link. Thus, in this example, the load balancing component 120 has detected an error condition has been satisfied with respect to the link 305 and accordingly has set the link 305 to a disabled state, as indicated by the hashed line.

As a result, the load balancing component 120 on the line card 325 in this example has determined mask values for transmitting data to the line cards 315, 335 that indicate the two links 350 should be used in transmitting data to the line card 335 and the three links 355 should be used in transmitting data to the line card 315. That is, as discussed above, the load balancing component 120 can determine the mask value for the line card 315 by calculating the intersection between a value representing the available links in links 320 and the available links in links 330. For example, the load balancing component 120 could determine the intersection between the value "00000110" representing the available links in links 340 (i.e., two links are currently available, since link 345 is currently in a low power mode and thus unavailable) and the value "00001111" representing the available links in links 330, thus producing a mask value of "00000110" for use in transmitting data from the line card 325 to the line card 335.

Likewise, the load balancing component 120 can determine the mask value for use with the line card 335 by calculating the intersection between a value representing the available links in links 340 and the available links in links 330. For example, the load balancing component 120 could determine that the intersection of the value "00001011" representing the available links in links 320 (i.e., three links are currently available, since the link 305 is currently experiencing problems in this example) and the value "00001111" representing the available links in links 330, thus producing a mask value of "00001011" for use in transmitting data from the line card 325 to the line card 315. As discussed above, the load balancing component 120 can dynamically update the mask values within the mask table 125 as the status of the links 320, 330, 340 changes, thus allowing the line cards 315, 325, 335 to take full advantage of their available bandwidth, while preserving the ability to disable and enable links on the fly without causing any packet loss.

Figure 4:
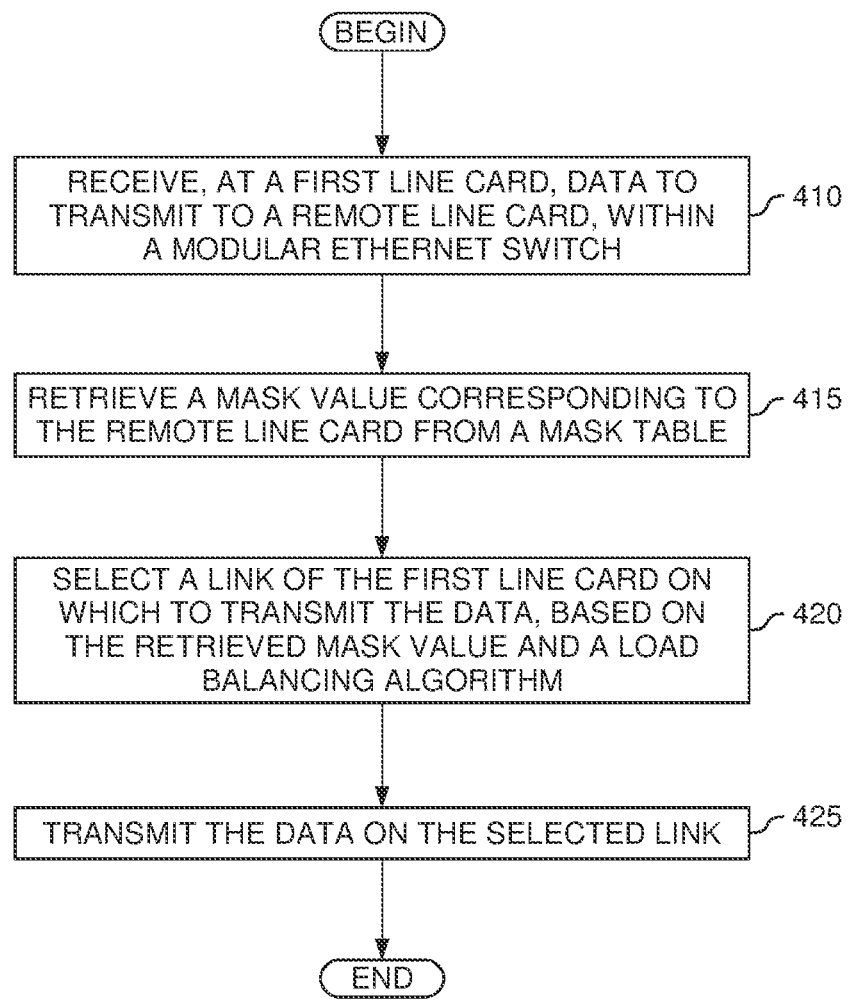
FIG. 4 is a flow diagram illustrating a method of load balancing traffic between line cards, according to one embodiment described herein.

FIG. 4 is a flow diagram illustrating a method of load balancing traffic between line cards, according to one embodiment described herein. As shown, the method 400 begins at block 410, where the load balancing component 120 receives, at a first line card, data to be transmitted to a remote line card within a modular Ethernet switch. The load balancing component 120 then accesses a mask table 125 using a forwarding index associated with the received data as an index, to retrieve a mask value corresponding to the remote line card (block 415). As discussed above, the load balancing component 120 can calculate the mask value within the mask table based on an intersection of a value representing available links at the first line card and a second value representing available links at the second line card.

The load balancing component 120 then selects one or more links of the first line card for use in transmitting the data to the remote line card across a network fabric, based on the retrieved mask value and a load balancing algorithm (block 420). While the load balancing component 120 can select a single link for transmitting the entirety of the data on, the load balancing component 120 can also be configured to distribute the data across multiple links for transmission to the second line card, based on the load balancing algorithm being employed. The load balancing component 120 then transmits the data on the selected one or more links (block 425), and the method 400 ends.

Figure 5:
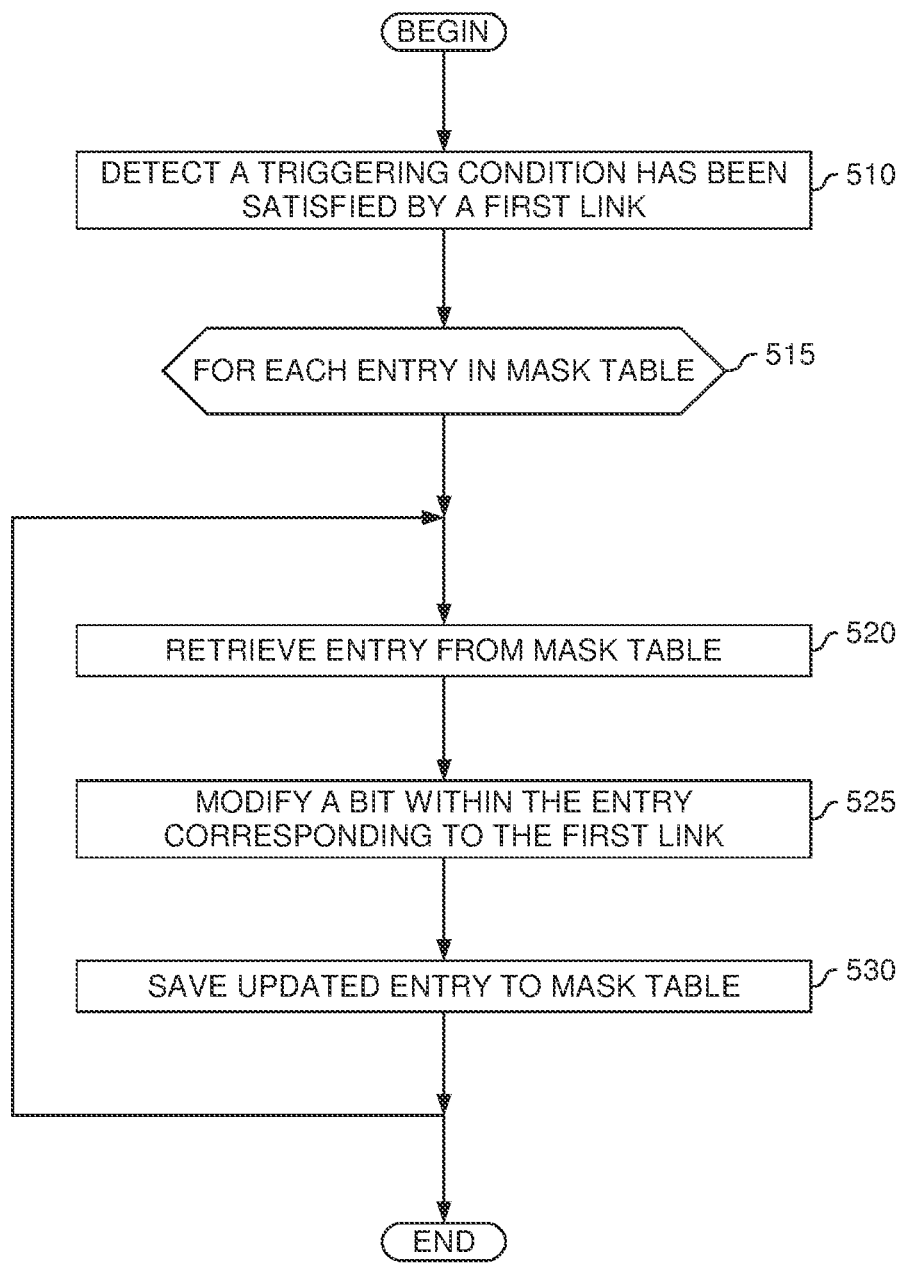
FIG. 5 is a flow diagram illustrating a method for updating a mask table for use in load balancing traffic between line cards, according to one embodiment described herein.

FIG. 5 is a flow diagram illustrating a method for updating a mask table for use in load balancing traffic between line cards, according to one embodiment described herein. As shown, the method 500 begins at block 510, where the load balancing component 120 detects a triggering condition has been satisfied by a first link. Generally, the triggering condition represents any condition associated with a state change of the first link. For example, the triggering condition could be a low traffic state for a particular line card and the load balancing component 120 could determine the first link should be set to a low power state as a result. As another example, the triggering condition could be an error condition corresponding to the first link, based on which the load balancing component 120 could determine the first link should be disabled until the error condition can be resolved. As yet another example, the triggering condition could represent a particular line card experiencing an increased traffic load and the load balancing component 120 could determine that the first link needs to be moved from a low power state to a full power state in order to increase the available bandwidth of the particular line card.

The method 500 then enters a loop for each entry in the mask table 125 (block 515), where the load balancing component 120 retrieves an entry from the mask table (block 520) and modifies a bit within the entry corresponding to the first link (block 525). For instance, if the triggering condition represents the first link experiencing an error condition, the load balancing component 120 could update the entry within the mask table in order to prevent traffic from being transmitted using the first link. As an example, the load balancing component 120 could set the bit within the mask value corresponding to the first link to a value of 0, such that the load balancing component 120 will not select the first link for use in transmitting data to the switching fabric. As another example, if the triggering condition represents an increased traffic load for a particular line card, the load balancing component 120 could update the entry within the mask table to enable the first link (e.g., from a low power mode to a full power mode). In this example, the load balancing component 120 could set the bit within the mask value corresponding to the first link to a value of 1, such that the load balancing component 120 can select the first link for use in transmitting data across the switching fabric. The load balancing component 120 then saves the updated entry in the mask table (block 530). The load balancing component 120 could then process the next entry within the mask table, at which point the method 500 returns to block 520. If no entries within the mask table remain, the method 500 ends.

Figure 6:
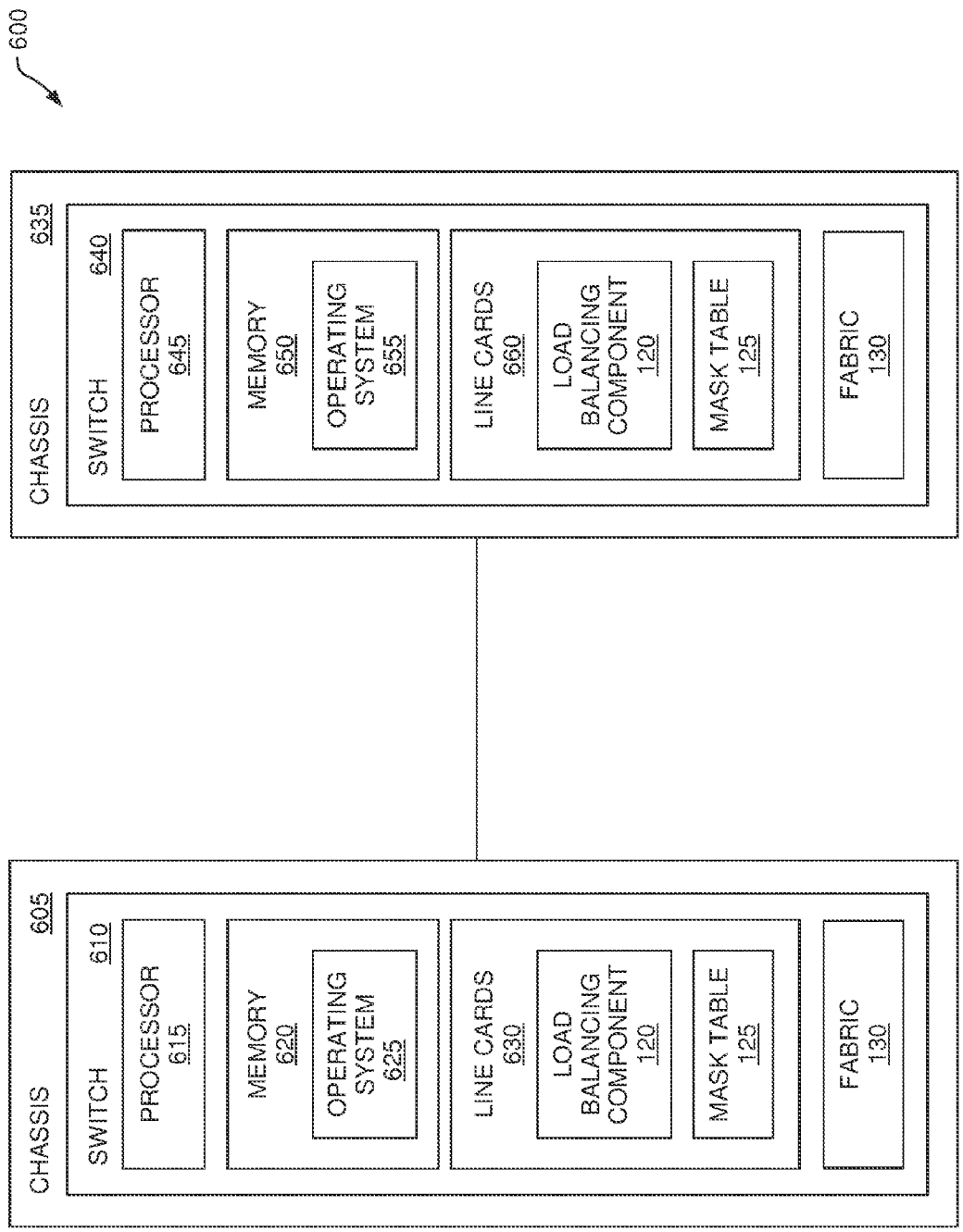
FIG. 6 is a block diagram illustrating interconnected modular Ethernet switches, according to one embodiment described herein.

FIG. 6 is a block diagram illustrating interconnected modular Ethernet switches, according to one embodiment described herein. As shown, the system 600 includes at least two physically distinct switches: switch 610 and switch 640. The switches 610, 640 are contained in respective chassis 605, 635. In one embodiment, the chassis 605, 635 are structures that enclose the various interconnected components of the routers 610 and 640. Furthermore, the chassis 605, 635 may provide a frame on which to mount the components of the routers 610, 640. For example, chassis 605 may be designed to include support elements for mounting the linecards 630 in the chassis 605 as well as openings for data ports that enable the linecards 630 to receive and forward data packets. Further still, the chassis 605 and 135 may be mounted into a rack or other storage mechanism.

Switches 610, 640 include processors 615, 645 and memories 620, 650. Processors 615, 645 may be implemented using one or more processors that may include any number of processing cores. Moreover, processors 615, 645 may be implemented using any processor design that is capable of performing the functions described herein.

Memories 620, 650 may include both volatile and non-volatile memory elements such as RAM, Flash memory, internal or external hard drives, EPROMs and the like. The memories 620, 650 store the operating systems 625 and 655 that include logic for controlling and monitoring the different functions performed by switches 610, 640. Operating systems 625, 655 may be any operating system, including any operating system that enables each of the switches 610, 640 to be virtualized into a single virtual switch.

Switches 610, 640 include a plurality of line cards 630, 660. Generally, the line cards 630, 660 are modular electronic circuits on printed circuit boards that include a plurality of ports that receive and forward data packets. Switches 610, 640 include a switching fabric 130 (i.e., a back plane) used to interconnect the line cards 630, 660 and to facilitate internal routing between the line cards 630, 660. Also, the operating systems 625, 655 may use the fabric 130 to configure and monitor the line cards 630, 660. In one embodiment, the chassis 605, 635 may be designed in a modular fashion such that line cards 630, 660 can be added to and removed from the switches 610, 640.

Although FIG. 6 illustrates interconnecting modular switches, the same techniques discussed herein may also be applied to other modular network devices that include line cards interconnected by some form of back plane (e.g., a switching fabric), e.g., modular routers, bridges, and the like. Moreover, switches 610, 640 may share the same chassis even though they are two independent and distinct devices with separately controlled linecards 630, 660.

Each of the line cards 630, 660 includes a load balancing component 120 and a mask table 125. Generally, the mask tables 125 include a plurality of mask values indexed by identifiers corresponding to remote line cards (e.g., forwarding indexes). For instance, each of the plurality of mask values can include a plurality of bits, where each bit in the plurality of bits corresponds to a respective one of the plurality of links. The load balancing component 120 could receive data to be transmitted to a second line card. The load balancing component 120 could then access the mask table 125, using a value corresponding to the second line card as an index, in order to retrieve one of the plurality of mask values. Additionally, the load balancing component 120 could select one of a plurality of links for use in transmitting the data to the second line card, based on a load balancing algorithm and the retrieved mask value. The load balancing component 120 could then transmit the data to the second line card using the selected link.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. For instance, the load balancing component 120 could be deployed on line cards within a network device in a cloud computing data center and the load balancing component 120 could provide load balancing functionality between the line cards within the network device. Doing so enables the network device to take full advantage of the available bandwidth between the line cards, while maintaining the ability to dynamically bring links online and offline without incurring any packet loss.

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    receiving, at a first line card within a modular Ethernet switch, data to be transmitted to a second line card within the modular Ethernet switch;
    accessing a mask table, using a forwarding index corresponding to the second line card, to retrieve a mask value, wherein the mask value represents a calculated intersection of a first value representing available links of the first line card and a second value representing available links of the second line card;
    selecting one of a plurality of links for the first line card for use in transmitting the data, based on a load balancing algorithm and the retrieved mask value; and
    transmitting the data to the second line card using the selected link.

2. The method of claim 1, wherein the mask value comprises a plurality of bits, wherein each of the plurality of links for the first line card corresponds to a respective one of the plurality of bits.

3. The method of claim 2, wherein selecting one of a plurality of links for the first line card for use in transmitting the data comprises:
    determining a subset of the plurality of links having corresponding bits in the plurality of bits set to 1; and
    selecting the link from the subset of links, based on the load balancing algorithm.

4. The method of claim 2, wherein the second line card includes a second plurality of links, and further comprising:
    determining a first value comprising a first plurality of bits, wherein each of the plurality of links for the first line card corresponds to a respective one of the first plurality of bits, wherein each of the first plurality of bits is set to 1 if the corresponding link is available to transmit data to the second line card and otherwise is set to 0;
    determining a second value comprising a second plurality of bits, wherein each of the second plurality of links for the second line card corresponds to a respective one of the second plurality of bits, wherein each of the second plurality of bits is set to 1 if the corresponding link is available to receive data from the first line card and otherwise is set to 0; and updating the mask table, using a value corresponding to the second line card as an index, by setting the mask value to an intersection of the first value and the second value.

5. The method of claim 1, further comprising:
responsive to detecting a state change event has occurred for a first one of the plurality of links for the first line card, updating values within the mask table to reflect the state change event for the first link.

6. The method of claim 5, wherein the state change event comprises at least one of an error condition and a low amount of traffic on the first link, and wherein updating values within the mask table comprises updating the values to reflect that the first link is in a disabled state, such that the first link will not be selected for use in transmitting the data.

7. The method of claim 5, wherein the state change event comprises the first link being brought online, and wherein updating values within the mask table comprises updating the values to reflect that the first link is in an enabled state, such that the first link can be selected for use in transmitting the data.

8. A network device, comprising: a plurality of line cards, each including a plurality of links; a fabric that interconnects the plurality of line cards; and
a processor configured to: receive, at a first line card of the plurality of line cards, data to be transmitted to a second line card of the plurality of line cards; access a mask table, using a forwarding index corresponding to the second line card, to retrieve a mask value, wherein the mask value represents a calculated intersection of a first value representing available links of the first line card and a second value representing available links of the second line card; select one of a plurality of links for the first line card for use in transmitting the data, based on a load balancing algorithm and the retrieved mask value; and transmit the data to the second line card using the selected link of the first line card.

9. The network device of claim 8, wherein the mask value comprises a plurality of bits, wherein each of the plurality of links for the first line card corresponds to a respective one of the plurality of bits.

10. The network device of claim 9, wherein the load balancing logic is configured to select one of a plurality of links for the first line card for use in transmitting the data by:
determining a subset of the plurality of links having corresponding bits in the plurality of bits set to 1; and
selecting the link from the subset of links, based on the load balancing algorithm.

11. The network device of claim 9, wherein the second line card includes a second plurality of links, and further comprising:
determining a first value comprising a first plurality of bits, wherein each of the plurality of links for the first line card corresponds to a respective one of the first plurality of bits, wherein each of the first plurality of bits is set to 1 if the corresponding link is available to transmit data to the second line card and otherwise is set to 0;
determining a second value comprising a second plurality of bits, wherein each of the second plurality of links for the second line card corresponds to a respective one of the second plurality of bits, wherein each of the second plurality of bits is set to 1 if the corresponding link is available to receive data from the first line card and otherwise is set to 0; and updating the mask table, using a value corresponding to the second line card as an index, by setting the mask value to an intersection of the first value and the second value.

12. The network device of claim 9, further comprising:
responsive to detecting a state change event has occurred for a first one of the plurality of links for the first line card, updating values within the mask table to reflect the state change event for the first link.

13. The network device of claim 12, wherein the state change event comprises at least one of an error condition and a low amount of traffic on the first link, and wherein updating values within the mask table comprises updating the values to reflect that the first link is in a disabled state, such that the first link will not be selected for use in transmitting the data.

14. The network device of claim 12, wherein the state change event comprises the first link being brought online, and wherein updating values within the mask table comprises updating the values to reflect that the first link is in an enabled state, such that the first link can be selected for use in transmitting the data.

15. A line card, comprising: a plurality of links connected to a network fabric; a memory containing a mask table, the mask table comprising a plurality of mask values indexed by identifiers corresponding to remote line cards, wherein each of the plurality of mask values comprises a plurality of bits, and wherein each bit in the plurality of bits corresponds to a respective one of the plurality of links; and a processor configured to perform an operation, comprising: receiving data to be transmitted to a second line card; accessing a mask table, using a forwarding index corresponding to the second line card, to retrieve a mask value, wherein the mask value represents a calculated intersection of a first value representing available links of the first line card and a second value representing available links of the second line card; selecting one of a plurality of links for use in transmitting the data to the second line card, based on a load balancing algorithm and the retrieved mask value; and transmitting the data to the second line card using the selected link.

16. The line card of claim 15, wherein selecting one of a plurality of links for the first line card for use in transmitting the data comprises:
determining a subset of the plurality of links having corresponding bits in the plurality of bits set to 1; and
selecting the link from the subset of links, based on the load balancing algorithm.

17. The line card of claim 15, wherein the second line card includes a second plurality of links, and further comprising:
determining a first value comprising a first plurality of bits, wherein each of the plurality of links corresponds to a respective one of the first plurality of bits, wherein each of the first plurality of bits is set to 1 if the corresponding link is available to transmit data to the second line card and otherwise is set to 0;
determining a second value comprising a second plurality of bits, wherein each of the second plurality of links for the second line card corresponds to a respective one of the second plurality of bits, wherein each of the second plurality of bits is set to 1 if the corresponding link is available to receive data from the first line card and otherwise is set to 0; and
updating the mask table, using a value corresponding to the second line card as an index, by setting the mask value to an intersection of the first value and the second value.

18. The line card of claim 15, the operation further comprising:
responsive to detecting a state change event has occurred for a first one of the plurality of links for the first line card, updating values within the mask table to reflect the state change event for the first link.

19. The line card of claim 18, wherein the state change event comprises at least one of an error condition and a low amount of traffic on the first link, and wherein updating values within the mask table comprises updating the values to reflect that the first link is in a disabled state, such that the first link will not be selected for use in transmitting the data.

20. The line card of claim 18, wherein the state change event comprises the first link being brought online, and wherein updating values within the mask table comprises updating the values to reflect that the first link is in an enabled state, such that the first link can be selected for use in transmitting the data.

* * * * *